United States Patent

[11] 3,607,371

| [72] | Inventors | James W. Haynes;<br>Kenneth H. Shaner, both of Towanda, Pa. |
|---|---|---|
| [21] | Appl. No. | 872,747 |
| [22] | Filed | Oct. 30, 1969 |
| [45] | Patented | Sept. 21, 1971 |
| [73] | Assignee | Sylvania Electric Products Inc. |

[54] PHOSPHATE-COATED RARE-EARTH OXIDE COMPOSITIONS AND A PROCESS FOR PRODUCING SAME
14 Claims, No Drawings

[52] U.S. Cl..................................................... 117/100 B,
117/33.5 CS, 252/301.4 R
[51] Int. Cl...................................................... B05c 7/14,
B44d 1/02
[50] Field of Search........................................... 252/301.4
RF; 117/33.5 C, 100 B

[56] References Cited
UNITED STATES PATENTS

| 2,274,163 | 2/1942 | Puleston et al. | 117/100 B X |
|---|---|---|---|
| 2,668,776 | 2/1954 | Miller | 117/100 B X |
| 2,697,668 | 12/1954 | Crosby et al. | 117/33.5 CS |
| 2,704,726 | 3/1955 | Markoski | 117/33.5 CS |
| 2,720,492 | 10/1955 | Ehman | 117/100 B X |
| 2,758,941 | 8/1956 | Crosby et al. | 117/100 B X |
| 2,817,599 | 12/1957 | Edwards et al. | 117/100 B X |
| 2,909,444 | 10/1959 | Seats et al. | 117/33.5 CS |
| 2,920,003 | 1/1960 | Davis | 117/100 B X |
| 2,965,512 | 12/1960 | Umberger et al. | 117/100 B X |
| 3,522,071 | 7/1970 | Yokota et al. | 117/100 B X |

*Primary Examiner*—Alfred L. Leavitt
*Attorneys*—Norman J. O'Malley, Donald R. Castle and William H. McNeill

ABSTRACT: Rare-earth oxide compositions can be improved in handling characteristics by increasing the bulk density of the compound by uniformly coating the finely divided particles with a corresponding rare-earth phosphate.

Aqueous media comprising suspensions of finely divided particles of rare-earth oxide compositions and a water-soluble orthophosphate source are agitated under controlled pH conditions for sufficient lengths of time to dissolve sufficient amounts of the rare-earth oxide compositions, and to reprecipitate them to form solid rare-earth-phosphate-coated rare-earth compounds. The solids are then separated from the aqueous phases, washed with water, and heat-treated for sufficient lengths of time.

3,607,371

PHOSPHATE-COATED RARE-EARTH OXIDE COMPOSITIONS AND A PROCESS FOR PRODUCING SAME

BACKGROUND OF THE INVENTION

This invention relates to rare-earth oxide compositions and improvements in methods of treating rare-earth oxide compositions. More specifically, it relates to oxides and rare-earth activated oxide phosphors, and to improvements in handling characteristics by increasing the bulk density of the compounds by thinly coating the finely divided particles with a corresponding rare-earth phosphate.

The rare-earth activated oxide phosphors can be used as the luminescent material in the manufacturing of viewing screens for color television cathode-ray tubes, color display systems, and the like. The phosphors are usually prepared by coprecipitating the oxide as oxalates or carbonates, firing said oxalates or carbonates, suspending said compounds in a liquid and then settling them onto a screen. When forming luminescent screens by settling such phosphors, certain difficulties are encountered. The untreated phosphors tend to aggregate and have poor adherence to the screen, if the screen is not horizontal or if there are areas which are inclined to the horizontal, such as the curved edges of the face of the cathode-ray tube.

An advantage of this invention is that the phosphors are so treated so as to impart better handling characteristics and improve their adherence and free-flowing properties.

While the major benefits are in the manufacturing of rare-earth phosphors, benefits are also obtained in less pure materials such as rare-earth oxides used in the preparation of refractory metals and alloys.

It is known that the addition of small amounts of yttrium reduces excessive grain growth in ferrous chromium aluminum alloys and that the addition of gadolinium gives higher tensile strength to titanium. It is also known that the handling of solids, especially in small amounts, is a problem and that it is more difficult to exercise control of solids than of liquids and slurries. Therefore, another advantage of this invention is that small amounts of expensive rare-earth oxides can be easily and accurately added to refractory metals and alloys. Other advantages will be apparent to those skilled in the art.

It is known that these difficulties can be improved in zinc sulfide and zinc calcium sulfide phosphors by coating the individual particles with calcium hydroxy phosphate. This is practiced in U.S. Pat. No. 2,758,941, whereby the phosphor particles are suspended in an aqueous medium, the solution is adjusted to pH 10.5 to 11.0, and a phosphate source is added to form a calcium hydroxy phosphate coating on the particles.

When this process is applied to the rare-earth phosphors, it kills the brightness and hence it generally is not used. When it is applied to the rare-earth oxides, because of the basicity of the solution, it generally does not coat the oxide and hence the practice is usually avoided.

Preferably, it is desired to coat the phosphors and oxides in such a way so as to improve the handling characteristics and the adherence properties, and in the case of phosphors, without a loss in brightness in the final product.

It is believed, therefore, that a composition which comprises a rare-earth oxide and a uniform coating of the corresponding rare-earth phosphate on the oxide and that the process for forming said coating on the oxide which improves the handling characteristics of the oxide, by increasing the bulk density without affecting the brightness when used as a phosphor, is an advancement in the art.

SUMMARY OF THE INVENTION

In accordance with one aspect of this invention, there is provided a composition comprising a partially acid-soluble rare-earth oxide coated with a corresponding rare-earth phosphate. The composition comprises from about 99.99 weight percent to about 95 weight percent of a rare-earth oxide and about 0.01 weight percent to about 5 weight percent corresponding rare-earth orthophosphate, wherein said orthophosphate substantially and uniformly coats the rare-earth oxide composition and said composition has a bulk density of at least about 1 g./cc. greater than an uncoated rare-earth oxide.

In accordance with another aspect of this invention, there is provided a process for forming a uniform rare-earth phosphate coating on the corresponding rare-earth oxide. The process comprises forming an aqueous medium comprising a suspension of finely divided particles of a rare-earth oxide and an aqueous medium containing an orthophosphate source, adjusting the pH of the resultant suspension, while agitating, from about 4 to about 5 to dissolve a portion of said rare-earth oxide, maintaining said pH for at least about 30 minutes, while agitating, to thereby form a solid rare-earth-phosphate-coated rare-earth oxide composition, separating said solid from the aqueous solution, washing said coated solid with water, and thereafter heating said coated solid to a temperature of from about 100° C. to about 1,200° C. for about 2 hours.

DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

The present invention relates to rare-earth-phosphate-coated rare-earth oxide compositions and a process for preparing said coated oxide compositions. Surprisingly, it has been found that rare-earth-phosphate-coated rare-earth compounds comprising from about 95 weight percent to about 99.99 weight percent of a rare-earth oxide and from about 0.01 weight percent to about 5 weight percent of the corresponding rare-earth phosphate, can be made by suspending the finely divided rare-earth oxide composition in an aqueous medium containing a water-soluble orthophosphate source, preferred sources being monoammonium orthophosphate and orthophosphoric acid, adjusting the pH of the resultant suspension from about 4 to about 5 to dissolve a portion of the rare-earth oxide, maintaining the pH for at least about 10 minutes, while agitating, to thereby form a solid rare-earth-phosphate-coated rare-earth oxide composition, separating said coated solid from the aqueous solution, washing said coated solid with water, and thereafter heating said coated solid to a temperature of from about 100° C. to about 1,200° C. for at least about one-half hour. Further, the rare-earth-phosphate-coated rare-earth oxide compositions have better handling characteristics than noncoated oxide compositions such as being free flowing and having "wet adherence" when used as a luminescent material, without any appreciable loss in brightness.

Referring now to the invention with greater particularity, yttrium, for purpose of this invention, is to be considered one of the rare-earth elements and included in the lanthanide series. The preferred rare-earth oxide compositions are partially acid soluble to the extent of from about 0.01 weight percent to about 5 weight percent at a pH of from about 4 to about 5 and are selected from the group consisting of yttrium oxide, gadolinium oxide, lutetium oxide, lanthanum oxide, europium oxide, and mixtures thereof, and from rare-earth-activated rare-earth oxide phosphors selected from the group consisting of rare-earth-activated oxides of yttrium, gadolinium, lanthanum, lutetium and mixtures thereof. Likewise, said rare-earth activator can be selected from the lanthanide series, but the preferred activators are selected from the group consisting of europium, samarium, praseodymium, and terbium. Especially preferred are europium-activated gadolinium oxide, europium-activated gadolinium-yttrium oxide, and europium-activated yttrium oxide, having a bulk density from about 9.5 to about 12.2. A minimum of about 1 g./cc. in bulk density greater than uncoated rare-earth compounds, improves the handling characteristics of said rare-earth-coated oxide compositions. Preferred bulk density increases are about 2 g./cc. to about 8 g./cc. greater than uncoated rare-earth oxide compositions. Bulk density increases greater than about 8 g./cc. do not usually enhance the handling characteristics of said rare-earth-coated oxide compositions and generally result in too heavy a coating of rare-earth phosphate, which in turn appreciably affects the characteristics of said rare-earth oxide composition.

Other substances can be used in place of orthophosphoric acid and monoammonium orthophosphate; for example, any of the sodium orthophosphates, potassium orthophosphates or other water-soluble orthophosphates can be used. It is preferred to control the proportion of orthophosphate and rare-earth compound such that the slurry contains between about 0.002 percent and 10.5 percent by weight of orthophosphate with respect to the weight of said rare-earth oxide compositions.

Any pH from about 4 to about 5 can be used. Below pH 4, too much of the rare-earth oxide is dissolved, resulting in uneconomical losses of said compound and too thick a coating of phosphate, which in turn causes loss in brightness in phosphors. Above a pH of about 5, insufficient amounts of rare-earth compounds dissolve, resulting in uneven and too thin a coating to improve handling characteristics. Nitric acid or hydrochloric acid can be used in addition to phosphoric acid to control the pH, but sulfuric acid and many organic acids are generally avoided because of their tendency to precipitate as sulfates, oxalates, and the like. Although as little as 10 minutes' agitation time can be used, at least about 30 minutes are preferred to insure complete and uniform phosphate coatings.

A minimum of about 5 cc. water per gram of said coated solid is used to insure removal of the cation portion of the water-soluble orthophosphate source used, to a level of about 5 p.p.m. Incomplete removal of the cation portion can result in loss of brightness.

The rare-earth-phosphate-coated rare-earth oxide compositions can then be dried at about 100° C. for about 2 hours, but it is preferred to then fire said coated oxide composition up to about 1,000° C. for about 2 hours, if a phosphor is to be produced. The closer the time and temperature is held at 1,000° C. for 2 hours without excessively deviating from said time and temperature; i.e., ±250° C. and ±30 minutes, the better the handling characteristics of said coated oxide phosphor. Shorter times and lower temperatures are less effective than preferred times and temperatures and longer times and higher temperatures are uneconomical and can be destructive to the phosphor.

To more fully illustrate the present invention, the following detailed examples are presented. All parts, proportions, and percentages are by weight, unless otherwise given.

Example 1

About 1 part gadolinium oxide phosphor activated by europium is slurried in about 4 parts of about 0.01 M monoammonium phosphate, prepared by dissolving about 2.16 g. monoammonium phosphate in about 1,800 ml. water, for about 30 minutes. After this treatment, the phosphor is filtered using vacuum and washed with about 5 parts deionized water. The phosphor is then dried at about 120° C. for about 2 hours before being fired at about 1,000° C. for about 2 hours.

Table I shows the effect on the bulk density, $PO_4^{13}$ concentration of the phosphor, and brightness caused by increasing the molarity of the orthophosphate solution, used in the preparation of coating said phosphor.

Table I

| Molarity of Orthophosphate Solution | Bulk Density of Fired Compound | % $PO_4^{13}$ On Fired Compound | % CRT Brightness |
| --- | --- | --- | --- |
| 0.00 | 12.2 | 0.00 | 100 |
| 0.01 | 19.4 | 0.40 | 100 |
| 0.05 | 20.6 | 0.83 | 100 |
| 0.10 | 20.3 | 0.96 | 100 |
| 0.50 | 20.5 | 1.30 | 96 |

Substantially similar results are obtained when other aqueous orthophosphate sources, i.e., diammonium hydrogen orthophosphate, trisodium orthophosphate, tripotassium orthophosphate, are substituted in substantially stoichiometric equivalent amounts.

Example 2

About 1 part gadolinium oxide phosphor activated by europium is slurried in about 4 parts of about 0.001 M orthophosphoric acid prepared by dissolving about 0.023 part of orthophosphoric acid in about 1,800 parts water, for about 30 minutes. After this treatment, the phosphor is filtered using vacuum, and washed with about 5 parts deionized water. The phosphor is then dried at about 120° C. for about 2 hours before being fired at about 1,000° C. for about 2 hours.

Table II shows the effect on the bulk density, $PO_4^{13}$ concentration of the phosphor caused by increasing the molarity of the orthophosphoric acid solution, used in the preparation of coating said phosphor.

Table II

| Molarity of Orthophosphoric Acid Solution | Bulk Density of Fired Compound | % $PO_4^{13}$ on Fired Compound |
| --- | --- | --- |
| 0.000 | 12.2 | 0.00 |
| 0.001 | 13.9 | 0.06 |
| 0.005 | 15.8 | |
| 0.01 | 17.3 | 0.39 |

Example 3

About 1 part gadolinium yttrium oxide phosphor activated by europium is slurried in about 4 parts of about 0.01 M monoammonium phosphate for about 30 minutes. After this treatment, the phosphor is filtered using vacuum and washed with about 5 parts deionized water. The phosphor is then dried at about 120° C. for about 2 hours before being fired to about 1,000° C. for about 2 hours.

Table III shows the effect on the bulk density, $PO_4^{13}$ concentration of the phosphor, and brightness caused by increasing the molarity of the orthophosphate solution, used in the preparation of coating said phosphor.

Table III

| Molarity of Orthophosphate Solution | Bulk Density of Fired Compound | % $PO_4^{13}$ in Fired Compound | % CRT Brightness |
| --- | --- | --- | --- |
| 0.00 | 11.9 | 0.00 | 100 |
| 0.01 | 12.8 | 0.03 | 100 |
| 0.05 | 13.7 | 0.09 | 100 |
| 0.10 | 14.5 | 0.18 | 102 |
| 0.50 | 18.2 | 0.63 | 104 |

Substantially similar results are obtained when other rare-earth compounds, i.e., lanthanum oxide, lutetium oxide, and mixtures thereof, are substituted in substantially stoichiometric equivalent amounts.

Example 4

The experiments as stated in example 3 are repeated using orthophosphoric acid as the water-soluble orthophosphate source.

Table IV shows the effect on the bulk density, $PO_4^{13}$ concentration of the phosphor, and caused by increasing the molarity of the orthophosphoric acid solution, used in the preparation of coating said phosphor.

Table IV

| Molarity of Orthophosphoric Acid Solution | Bulk Density of Fired Compound | % $PO_4^{13}$ in Fired Compound |
|---|---|---|
| 0.000 | 11.9 | 0.00 |
| 0.001 | 13.9 | 0.06 |
| 0.005 | 15.3 | |
| 0.01 | 15.1 | 0.36 |

Example 5

About 1 part yttrium oxide phosphor activated by europium is slurried in about 4 parts of about 0.01 M monoammonium phosphate for about 30 minutes. The phosphor is then filtered using vacuum, and washed with about 5 parts deionized water. The phosphor is then dried at about 120° C. for about 2 hours before being fired at about 1,000° C. for about 2 hours.

Table V shows the effect on the bulk density, $PO_4^{13}$ concentration of the phosphor, and brightness caused by increasing the molarity of the orthophosphate solution used in the preparation of coating said phosphor.

Table V

| Molarity of Orthophosphate Solution | Bulk Density of Fired Compound | % $PO_4^{13}$ in Fired Compound | % CRT Brightness |
|---|---|---|---|
| 0.00 | 9.5 | 0.00 | 100 |
| 0.10 | 11.1 | 0.43 | 100 |
| 0.05 | 12.4 | 1.10 | 93 |
| 0.10 | 12.7 | 2.10 | 93 |
| 0.50 | 12.1 | 3.70 | 88 |

Example 6

The experiments as stated in example 5 are repeated using orthophosphoric acid as the water-soluble orthophosphate source.

Table VI shows the effect on the bulk density, $PO_4^{13}$ concentration of the phosphor, and caused by increasing the molarity of the orthophosphoric acid solution used in the preparation of coating said phosphor Table VI

| Molarity of Orthophosphoric Acid Solution | Bulk Density of Fired Compound | % $PO_4^{13}$ in Fired Compound |
|---|---|---|
| 0.000 | 9.5 | 0.00 |
| 0.001 | 11.4 | 0.05 |
| 0.005 | 10.4 | |
| 0.01 | 11.6 | 0.39 |

While there has been shown and described what are at present considered the preferred embodiments of the invention, it will be obvious to those skilled in the art that various changes and modifications may be made herein without departing from the scope of the invention as defined by the appended claims.

What we claim is:

1. A composition consisting essentially of from about 95 percent to about 99.99 percent by weight of a partially acid-soluble rare-earth oxide and from about 0.01 weight percent to about 5 weight percent of the corresponding rare-earth orthophosphate, wherein said orthophosphate substantially and uniformly coats said rare-earth oxide, and said composition having a bulk density of at least 1 g./cc. greater than the corresponding uncoated rare-earth oxide.

2. A composition according to claim 1, wherein said rare-earth oxide has a cation selected from the group consisting of yttrium, gadolinium, lanthanum, lutetium, europium, and mixtures thereof.

3. A composition according to claim 1, wherein said rare-earth oxide is a rare-earth-activated rare-earth oxide phosphor and said rare-earth oxide is selected from the group consisting of oxides of yttrium, gadolinium, lanthanum, lutetium and mixtures thereof.

4. A composition according to claim 3, wherein said activator is selected from the group consisting of europium, semarium, praseodymium, and terbium.

5. A composition according to claim 1, wherein said rare-earth oxide composition has an average bulk density of from about 2 g./cc. to about 8 g./cc. greater than uncoated rare-earth oxide.

6. In a process for preparing rare-earth-phosphate-coated rare-earth oxide compositions, the steps comprising
 a. forming an aqueous medium comprising a suspension of finely divided particles an aqueous medium comprising a suspension of finely divided particles of a rare-earth oxide and a water-soluble orthophosphate source, wherein said orthophosphate is present in an amount of about 0.002 percent to about 10.5 percent, by weight, with respect to the weight of said oxide,
 b. adjusting the pH of the resultant suspension, while agitating, from about 4 to about 5,
 c. maintaining said pH, while agitating, for at least about 10 minutes, to thereby form a solid rare-earth-phosphate-coated rare-earth oxide,
 d. separating said coated solid,
 e. washing said coated solid with at least about 5 cc. water per gram of said solid, and
 f. thereafter heating said coated solid from about 100° C. to about 1,200° C. for at least about one-half hour.

7. A process according to claim 6, wherein said water-soluble orthophosphate is selected from the group consisting of ammonium orthophosphates, alkali metal orthophosphates, and mixtures thereof.

8. A process according to claim 7, wherein said water-soluble orthophosphate is monoammonium orthophosphate.

9. A process according to claim 6, wherein said water-soluble orthophosphate is orthophosphoric acid.

10. A process according to claim 6, wherein said rare-earth oxide has a cation selected from the group consisting of yttrium, gadolinium, lanthanum, lutetium, europium and mixtures thereof.

11. A process according to claim 6, wherein said rare-earth oxide is a rare-earth-activated rare-earth oxide phosphor and wherein said rare-earth oxide is selected from the group consisting of oxides of yttrium, gadolinium, lanthanum, lutetium, and mixtures thereof.

12. A process according to claim 6, wherein said pH is held from about 10 minutes to about 30 minutes.

13. A process according to claim 6, wherein said coated solid is heated for about one-half hour to about 2 hours.

14. A process according to claim 6, wherein said pH is adjusted with a mineral acid selected from the group consisting of nitric acid, hydrochloric acid, and orthophosphoric acid.

PO-1050
(5/69)

UNITED STATES PATENT OFFICE
CERTIFICATE OF CORRECTION

Patent No. 3,607,371      Dated September 21, 1971

Inventor(s) James W. Haynes & Kenneth H. Shaner

It is certified that error appears in the above-identified patent and that said Letters Patent are hereby corrected as shown below:

Col. 3, line 65 in the specification "$PO_4^{13}$" should read -- "$PO_4^{-3}$" --.

Col. 3, Table I " " " "$PO_4^{13}$" should read "$PO_4^{-3}$" --.

Col. 3, Table I - 4th Col. incorrectly spaced

Col. 4, line 25 in the specification "$PO_4^{13}$" should read -- "$PO_4^{-3}$" --.

Col. 4, Table II "$PO_4^{13}$" should read "$PO_4^{-3}$" --.

Col. 4, line 54 in the specification "$PO_4^{13}$" should read -- "$PO_4^{-3}$" --.

Col. 4, Table III "$PO_4^{13}$" should read "$PO_4^{-3}$" --.

Col. 5, line 4 in the specification "$PO_4^{13}$" should read -- "$PO_4^{-3}$" --.

Col. 5, Table IV "$PO_4^{13}$" should read "$PO_4^{-3}$" --.

Col. 5, line 29, in the specification "$PO_4^{13}$" should read -- "$PO_4^{-3}$" --.

Col. 5, Table V "$PO_4^{13}$" should read "$PO_4^{-3}$" --.

Col. 5, line 53 "$PO_4^{13}$" in the specification should read -- "$PO_4^{-3}$" --.

Col. 5, Table VI "$PO_4^{13}$" should read "$PO_4^{-3}$" --.

Col. 6, Claim 6 a. "an aqueous medium comprising a suspension of finely divided particles" should be deleted second instance.

Signed and sealed this 28th day of March 1972.

(SEAL)
Attest:

EDWARD M. FLETCHER, JR.      ROBERT GOTTSCHALK
Attesting Officer      Commissioner of Patents